United States Patent [19]
Szanny

[11] 3,718,881
[45] Feb. 27, 1973

[54] DETACHABLE FASTENING CLIP

[75] Inventor: Roy G. Szanny, Hubbard, Ohio

[73] Assignee: General Motors Corporation, Detroit, Mich.

[22] Filed: March 27, 1972

[21] Appl. No.: 238,383

[52] U.S. Cl. .................... 338/22, 24/81 R, 24/81 B, 24/255 A
[51] Int. Cl. .............................................. H01c 7/04
[58] Field of Search ...338/22, 25; 24/255 A, 255 SP, 24/81 B, 81 R, 73 B; 85/81

[56] References Cited

UNITED STATES PATENTS

| | | | |
|---|---|---|---|
| 85,953 | 1/1869 | Muller | 24/255 SP |
| 2,363,075 | 11/1944 | Mattern | 338/25 X |
| 3,243,572 | 3/1966 | Vogt et al. | 338/22 R X |

Primary Examiner—C. L. Albritton
Attorney—W. E. Finken et al.

[57] ABSTRACT

This disclosure relates to a one-piece detachable fastening clip for retaining two mating bodies in engagement with each other. The clip comprises two integral and resilient bent arm members which terminate in free ends and which have tangs struck therefrom and which are bent inwardly toward each other for receiving and retaining one of the mating bodies between the arm members. The free ends of the arm members are bent inwardly toward each other, and handles or control arms are struck from the arm members and bent outwardly therefrom and extend away from the free ends. The free ends are deflected outwardly away from each other and against the self-biasing force of the arm members when the control arms are pinched toward each other to thereby allow the other of the mating bodies to be received between the arm members and to mate with the one mating body. The inherent biasing forces of the arm members causes the free ends to move inwardly when the control arms are released to detachably engage the other mating body.

4 Claims, 6 Drawing Figures

PATENTED FEB 27 1973 3,718,881

DETACHABLE FASTENING CLIP

The present invention relates to a detachable fastening clip, and more particularly, to a detachable fastening clip which lockingly retains one mating body and which detachably engages another mating body to retain the two bodies in mating engagement.

Thermistors are currently proposed for use in electronic fuel injection systems for automotive vehicles. In these systems, a plurality of thermistors are positioned within the engine compartment, such as being threadably engaged with studs on the engine block, in order to sense a multiplicity of ambient conditions. The thermistors provide variable electronic signals which depend upon the ambient conditions and which serve to control the amount of fuel fed to the vehicle'engine. The terminal of each thermistor is mated with the terminal of a lead from a power source. In this respect, a connecting clip is highly desirable for efficiency purposes in assembly and disassembly which would lockingly engage the thermistor connector and which would detachably engage the thermistor in order to mate the connector and thermistor.

Connecting clips have heretofore been provided wherein bent arm portions are pinched in order that the clip can be attached to a first body and which thereafter engages a fastening means in order that a second body can be connected with the first body. For example, see U.S. Pat. No. 2,426,799. Connecting clips have also been provided with bent arm portions which snappingly engage one of two mating parts to retain it relative to a third part for engagement with the second mating part. For example, see U.S. Pat. No. 2,303,148. Further, connecting clips have been provided with bent arm portions which snappingly receive a first part and engage a second part while being detachable from the second part upon pinching of the bent arms. For example, see U.S. Pat. No. 2,968,850.

An object of the present invention is to provide a new and improved fastening clip for retaining two mating bodies in engagement with each other and which is of a simple and economical construction and which is of a construction and arrangement such that it snap fittingly receives and retains one of the mating bodies and detachably retains the other of the mating bodies in engagement with the one body.

It is another object of the present invention to provide a new and improved one-piece detachable fastening clip for retaining two mating bodies in engagement with each other and which comprises two integral and resilient bent arm members which terminate in free ends and which have tangs struck therefrom intermediate its ends and bent inwardly toward each other for receiving and retaining one of the mating bodies between the arm members, and wherein the free ends of the arm members are bent inwardly toward each other and control arms are struck from the arm members and bent outwardly therefrom to extend away from the free ends of the arm members, and wherein the free ends are deflected outwardly away from each other and against the self-biasing force of the arm members when the control arms are pinched toward each other to allow the other of the mating bodies to be received between the arm members and to mate with the one mating body and wherein the self-biasing force of the arm members causes the free ends to move inwardly when the control arms are released to detachably engage the other mating body.

Another object of the present invention is to provide a detachable fastening clip as described in the previous objects and wherein the fastening clip lockingly engages a thermistor connector and detachably engages a thermistor when the connector and thermistor are mated.

These and other objects and advantages of the present invention will become more fully apparent from the following description and drawings wherein.

As representing a preferred embodiment of the present invention, the drawings show a detachable fastening clip 10 for holding a first mating body 12 in engagement with a second mating body 14.

Figure 4:
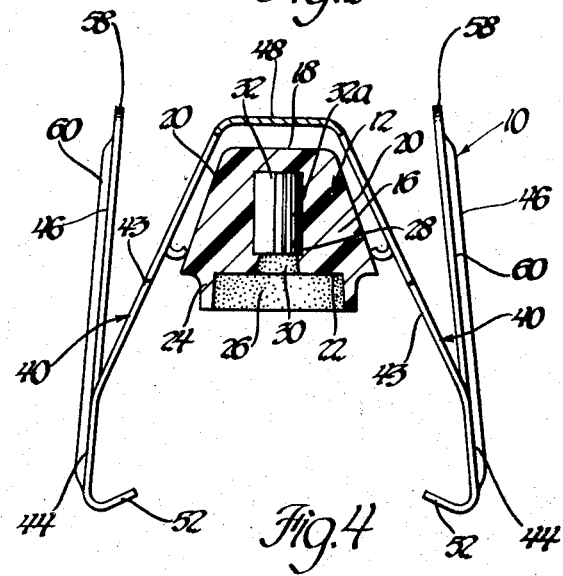
FIG. 4 is a view similar to FIG. 1 but with a first mating body being engaged with the clip.
Figure 5:
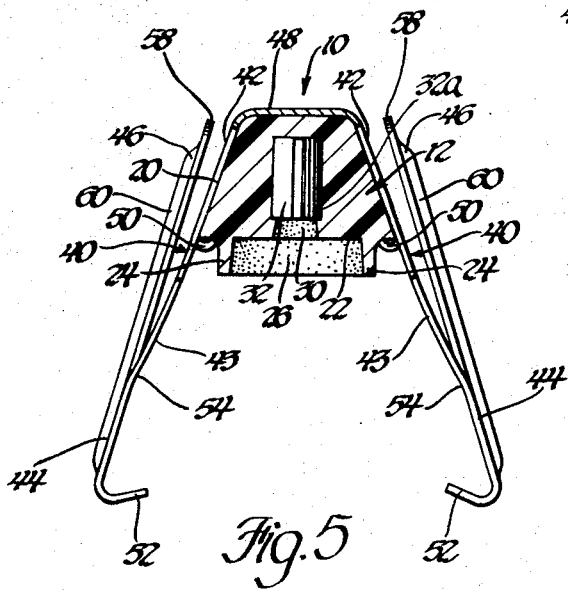
FIG. 5 is a view similar to FIG. 4 but with different parts in different positions.

Referring to FIGS. 4 and 5, the first and second mating bodies 12 and 14 are herein shown as a thermistor connector and a thermistor, respectively, such as those which can be employed in electronic fuel injection systems for automotive vehicles. It should be understood, however, that the clip 10 of the present invention could be used to connect together various kinds of mating bodies or components.

The thermistor connector 12 comprises an insulating body 16 of any suitable insulating material, such as rubber or plastic, and is somewhat elongated (not shown) and generally trapezoidal in shape when viewed in cross-section. Referring to FIG. 4, the insulator body 16 has a flat top side 18, a pair of inclined sides 20, and a bottom side 22 which is wider than the top side 18 and which together define the generally trapezoidal shape of the insulator body 16 when it is viewed in cross-section. The insulating body 16 has a generally circular or annular flange 24 which projects from its bottom side 22 and defines a circular cavity 26. Further, the insulator body 16 has a generally cylindrical chamber 28 located centrally therein and which is coaxial with the circular cavity 26. The circular cavity 26 and the inner chamber 28 are connected via an entrance opening 30 which is of a slightly smaller diameter than the chamber 28. The inner cylinder chamber 28 houses a complementary shaped female terminal 32 which is connected with a power source (not shown), such as the battery of an automotive vehicle, via a lead wire (not shown) which extends into the insulator body 16 and which is suitably connected with the terminal 32. The female terminal 32 has circumferentially spaced Radially expandable and contractable portions 32a.

Figure 6:
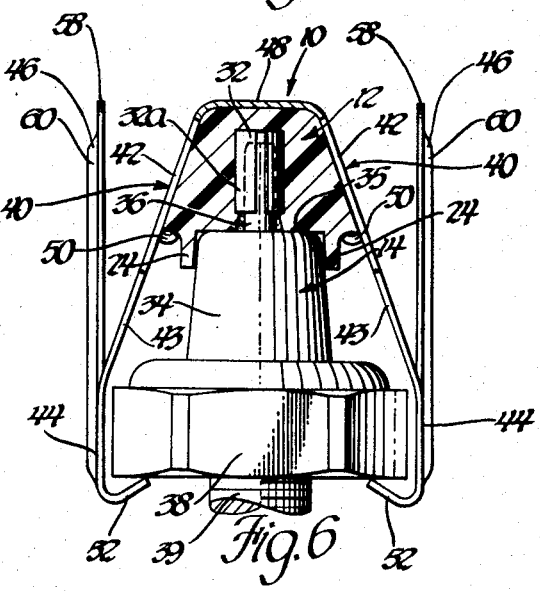
FIG. 6 is yet another view similar to FIG. 4 but with the clip holding the first mating body and a second mating body in engagement with each other.

The thermistor 14, as shown in FIG. 6, includes a frusto-conical upper portion 34 having a top surface 35 from which a cylindrical male terminal 36 projects. The upper end of the frusto-conical upper portion 34 is generally complementary in shape to the circular cavity 26 of the thermistor connector 16. The male terminal 36, is generally complementary in shape to the female terminal 32 of the thermistor connector 12 and is adapted to be frictionally received with the portions 32a of the female terminal 32. The thermistor 14 also includes a lower portion 38 in the form of an octagonal head which has a threaded stud 39 thereon which is used to attach the thermistor 14 to some complementary threaded independent body (not shown), such as an engine block in an automotive vehicle. In this respect the octagonal head provides means for gripping and turning the thermistor 14 into threaded engagement.

Figure 1:
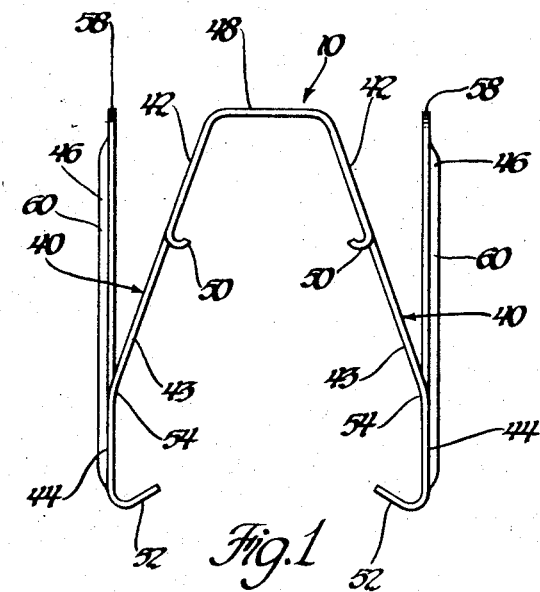
FIG. 1 is a front elevational view of the detachable fastening clip of the present invention.

The detachable fastening clip 10 comprises a single piece member which is stamped from flat spring steel stock and lanced and bent to the configuration shown in FIG. 1 by a suitable die apparatus. The clip 10 broadly comprises a pair of bent arm members 40 having upper portions 42 for gripping and holding the insulator body 16 intermediate portions 43 and lower portions 44 for holding the thermistor 14, and a pair of manually manipulatable handles or control arms 46 for flexing the lower portions of the arms toward and from each other to enable the thermistor to be attached and detached from the insulator body 16.

Figure 2:
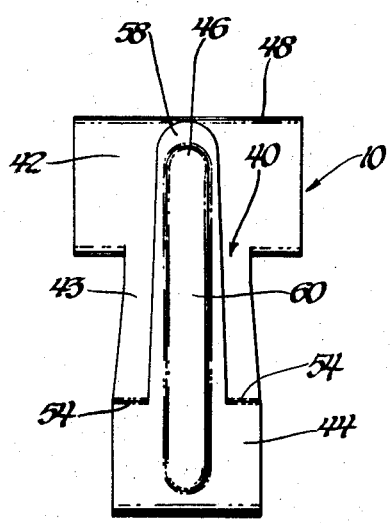
FIG. 2 is an end elevational view of the same.
Figure 3:
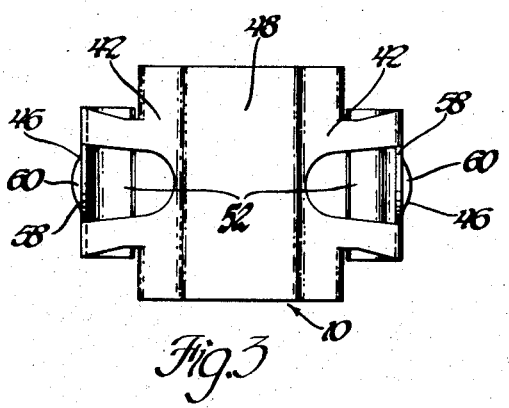
FIG. 3 is a plan view of the same.

Referring to FIGS. 1 – 3, the detachable fastening clip 10 includes a flat upper base portion 48 from whose opposite ends the bent arm members 40 extend in a flaring or diverging relationship. As best shown in FIGS. 2 and 3, the upper base portion 48 and the upper portions 42 of the two bent arm members 40 are of substantially greater width than the intermediate and lower portions 43 and 44 of the bent arm members 40. The upper portions 42 of the two bent arm members 40 extend from the opposite ends of the upper base portion 48 and both terminate in pairs of the curled tongs 50 which are struck or lanced from the upper portion 42 at positions substantially adjacent the narrower intermediate portions 43 and which are curled inwardly toward each other. The upper base portion 48, the upper portions 42 of the two bent arm members 40, and the pairs of tangs 42, as best shown in FIG. 1, define a shape substantially complementary to the trapezoidal shape of the insulator body 16 when viewed in cross-section.

The lower portions 44 of the arm members 40 have their free ends 52, as shown in FIG. 1, curled and bent inwardly toward each other. The lower portions 44 of the arm members 40, except for the free ends 52, extend parallel to each other and are spaced apart a distance substantially equal to the diameter of the lower portion 38 of the thermistor 14. In other words, the lower portions 44 are formed substantially complementary to the outer periphery of the lower portion 38 of the thermistor 14. The lower portions 44 of the arm members 40 form an obtuse included angle with the intermediate portions 43 and the lower portions 44 can be flexed toward and from each other about their juncture 54 with the intermediate portions 43. The juncture 54 provides flexible hinge means about which the control arms 46 and lower portions 44 of the arms 40 move in unison with respect to the upper and lower portions 42 and 43 of the arms 40.

The control arms 46 are struck or lanced from the mid-portion of the arm members 40. The control arms 46 are integral with the lower portion 44 at the juncture 54 between the intermediate and lower portions 43 and 44. Further, the control arms 46 terminate in free ends 38 and are formed in a parallel relationship substantially the same distance apart as the parallel lower portions 44. Additionally, the control arms 46 and the lower portions 44 of the bent arm members 40 include embossed impressions 60 which extend centrally from the free ends 58 of the control arms 46 to immediately adjacent the bent free ends 52 of the lower portions 44 of the control arms 40. The embossed impressions 60, as is well known in the art, strengthen the control arms 46 and the lower portions 44 of the arms 40 to substantially prevent any deflection therebetween when the free ends 58 of the control arms 46 are pinched together, as will later be described.

In operation, the thermistor connector 12 is positioned between the two bent arm members 40 and thereafter, the thermistor connector is moved upwardly between the pairs of tangs 50 until the tangs 50 engage the inclined sides 20 of the connector 12. When the connector 12 is forced further upwardly, the tangs 50 and two bent arm members 40 of the fastening clip 10 are deflected outwardly away from each other, and when the bottom side 22 of the connector 12 passes the tangs 50, the two bent arm members 40 snap inwardly to seat the tangs 50 against the bottom side 22 of the connector 12 and thereby lockingly engage the connector 12. The fastening clip 10 and assembled thermistor 12 are then positioned over the thermistor 14 and the free ends 58 of the control arms 46 are manually pinched together. As the free ends 58 of the control arms 46 approach one another, the free ends 52 and the lower portions 44 are deflected about the portions 54 of the two bent arm members 40 outwardly away from one another. Thus, the two lower portions 44 of the bent arm members 40 can be received about the thermistor 14. As the two bent arm members are received about the thermistor 14, the thermistor 14 and the connector 12 are mated in engagement with the male terminal 36 entering opening 30 and the female terminal 32 and with the frusto-conical upper portion 34 being received within the circular cavity 26 of the thermistor connector 12. Thereafter, when the free ends 58 of the control arms 46 are released, the lower portions 44 move resiliently inwardly and engage the periphery of the octagonal head 38 of the thermistor 14 at opposite sides thereof, and the free ends 52 also move resiliently inwardly behind the head 38 of the thermistor 14 to lock the clip 10 thereto and retain the connector 12 and the thermistor 14 in mating engagement.

It should be readily apparent that the clip 14 can easily be detached from locking engagement with the thermistor 14 by merely pinching the free ends 58 of the control arms 46 together and pulling the thermistor 14 of the thermistor connector 12 out of mating engagement.

The foregoing disclosure relates to only one embodiment of the invention which may be modified within the scope of the appended claims.

What is claimed is:

1. A one-piece detachable fastening clip for retaining two mating bodies in engagement with each other comprising: two integral and resilient bent arm members terminating in free ends, said arm members having tang means struck therefrom intermediate their ends and bent inwardly toward each other for receiving and retaining one of the mating bodies between said arm members, said free ends of said arm members being bent inwardly toward each other, control arms struck from said arm members and bent outwardly therefrom and extending away from said free ends of said arm members, said free ends being deflectable outwardly away from each other and against the self-biasing force of said arm members when said control arms are pinched toward each other to allow the other of the mating bodies to be received between said arm members and to mate with said one mating body, and the self-biasing force of said arm members causing said free ends to move inwardly when said control arms are released to detachably engage said other mating body.

2. A one-piece detachable fastening clip for retaining two mating components in engagement with each other, comprising: two integral and resilient arm members formed in a diverging relationship and terminating in free ends, each of said arm members having tang means struck therefrom intermediate their ends and bent inwardly toward each other for snap fastening one of said mating components between said arm members, said arm members between said tang means and said free ends having a portion complementary to the other of said mating components, said free ends being bent inwardly toward each other, control arms struck from said arm members and bent outwardly therefrom and extending oppositely from said free ends, said free ends and the complementary portion of said arm members being deflected outwardly when said control arms are pinched toward each other to allow said arm members to be received about said other mating component and for said other mating component to mate with said one mating component, and the self-biasing force of said arm members causing said complementary portions to move inwardly to peripherally engage said other mating component and causing said free ends to move inwardly and pass behind said other mating component when said control arms are released to detachably engage said other mating component.

3. A one-piece detachable fastening clip for retaining a connector body in engagement with a mating thermistor, comprising: a flat base portion, two resilient and spaced apart are members bent into a diverging relationship from said base portion, said arm members terminating in free ends, each of said arm members having pairs of tangs struck therefrom between said base portion and said free ends, said pairs of tangs being bent inwardly toward the opposite arm members and being adapted for snap fastening locking engagement with the connector to retain the connector between said arm members, said arm members between said pairs of tangs and said free ends having portions complementary in shape to the outer periphery of the thermistor, said free ends of said arm members being bent inwardly toward each other; a pair of control arms struck from said arm members and bent outwardly therefrom into a parallel relationship and extending from between said tangs and said free ends oppositely from said free ends, said free ends and the complementary portions of said arm members being deflected outwardly against the self-biasing force of said arm members when said control arms are pinched to allow the arm members to be received about the thermistor and for the connector to mate with the thermistor, and the self-biasing force of said arm members causing said complementary portion to move inwardly to engage the periphery of the thermistor and causing the free ends to move inwardly and behind the thermistor when said control arms are released to detachably engage said thermistor.

4. A thermistor connection, comprising: a thermistor; a thermistor connector matingly engageable with said thermistor; and a one-piece detachable fastening clip for retaining said connector in mating engagement with said thermistor; said fastening clip having a base portion with two arm members extending therefrom in a manner complementary to the shape of said connector, said arm members terminating in free ends and each having a pair of tangs struck therefrom between said base portion and said free ends, said pairs of tangs being bent inwardly toward the opposite arm member for snap fastening locking engagement with said connector when said connector is received between said arm members and adjacent said base portion, said arm members between said pairs of tangs and said free ends having a portion complementary in shape to said thermistor, said free ends of said arm members being bent inwardly toward each other, said fastening clip having control arms struck from said arm members and bent outwardly therefrom and extending away from said free ends, said free ends and the complementary portions of said arm members being deflected outwardly against the self-biasing force of said arm members when said control arms are pinched toward each other to allow said arm members to be received about said thermistor and for said connector to mate with said thermistor, and the self-biasing force of said arm members causing said complementary portions to move inwardly to peripherally engage said thermistor and causing said free ends to move inwardly and pass behind said thermistor when said control arms are released to detachably engage said clip with said thermistor.

* * * * *